United States Patent
Müller (10) Patent No.: US 6,652,372 B2
(45) Date of Patent: Nov. 25, 2003

(54) AIRFLAP

(75) Inventor: Thomas Müller, Bad Rodach (DE)

(73) Assignee: Valeo Klimasysteme GmbH, Rodach (DE)

( * ) Notice: Subject to any disclaimer, the term of this patent is extended or adjusted under 35 U.S.C. 154(b) by 0 days.

(21) Appl. No.: 09/892,795

(22) Filed: Jun. 28, 2001

(65) Prior Publication Data

US 2002/0016147 A1 Feb. 7, 2002

(30) Foreign Application Priority Data

Jun. 30, 2000 (DE) .......................... 100 31 991

(51) Int. Cl.[7] ................................. B60H 1/00
(52) U.S. Cl. .................. 454/159; 454/156; 454/160
(58) Field of Search .................. 454/69, 121, 126, 454/156, 159, 160, 161

(56) References Cited

U.S. PATENT DOCUMENTS 3,318,225 A 5/1967 May
6,007,421 A * 12/1999 Schwarz ................ 137/601.18
6,230,795 B1 * 5/2001 Tsunooka et al. ........... 165/203

FOREIGN PATENT DOCUMENTS

| DE | 4214862 | 5/1993 | |
|----|---------|--------|---|
| DE | 19819280 | 11/1998 | |
| DE | 19733052 | 2/1999 | |
| DE | 4228866 | 3/1999 | |
| DE | 19808676 | 9/1999 | |
| FR | 1199889 | 12/1959 | |
| FR | 2655713 | 12/1990 | |
| GB | 492994 | 9/1938 | |
| GB | 2 130 359 | * 5/1984 | ................ 454/161 |
| WO | 89/03006 | 4/1989 | |

* cited by examiner

Primary Examiner—Harold Joyce
(74) Attorney, Agent, or Firm—Liniak, Berenato & White (57) ABSTRACT

The present invention relates to an air flap (10) for an air-ducting device, in particular a vehicle heating, ventilation and/or air-conditioning system, with at least two ducts (2, 4), which have a common outlet zone, comprising a region (12) which allows part of the outlet zone to be divided in a sealed manner in each position of the air flap (10), the region (12) being smaller than the area of the air flap.

41 Claims, 9 Drawing Sheets

AIRFLAP

FIELD OF THE INVENTION

The present intention relates in general terms to an air flap for an air-ducting device with at least two ducts, which have a common outlet zone, and in particular to an air flap for a vehicle heating, ventilation and/or air-conditioning system. The two ducts with a common outlet zone can be, for example, the fresh-air or cold-air path, on the one hand, and the warm-air path on the other hand, the heating heat exchanger being arranged in the latter, the common outlet zone often being referred to in this case as a mixing zone, while the air flap in this application is generally referred to as the mixed-air flap.

BACKGROUND OF THE INVENTION

Currently known mixed-air flaps are generally of the butterfly type and are arranged in such a way in the mixing zone that the warm-air duct is blocked in one end position while, in another position, the fresh-air duct is blocked. In the intermediate positions, the mixed-air flap allows air to pass out of both ducts, depending on its position. In the intermediate positions, the two ducts are connected together both upstream and downstream of the flap in terms of flow, with the result that it is possible not only for the desired mixing of air to take place in the mixing zone but also for each of the air ducts to affect the other owing to the build-up of back-pressure.

Such mixed-air flaps furthermore often lead to unwanted noise and, in some applications, also do not enable the desired clear cross section of the ducts in question to be exposed.

In addition to the above-mentioned mixed-air flaps of the butterfly type, so-called shell-type flaps are known for other applications in the motor-vehicle sector, e.g. for selecting fresh air and recirculated air in air-conditioning systems (DE-A-4228866). These so-called shell-type flaps often lead to noise generation in the closing range and require a considerable amount of installation space, for which reason this type of air flap is seldom used despite the fact that it allows permanent separation of two air ducts ending in a common outlet zone.

There has therefore long been a requirement for an air flap which can prevent mixing of air in ducts upstream of it while being of simple construction, other requirements being that the cross section exposed should be as large as possible in open positions and that noise generation should be minimised in this position.

SUMMARY OF THE INVENTION

According to the invention, this object is achieved by an air flap with the features of claim 1. Preferred embodiments are defined in the dependent claims.

In particular, the invention proposes an air flap for an air-ducting device, in particular a vehicle heating, ventilation and/or air-conditioning system, with at least two ducts, which have a common outlet zone, which comprises a region which allows part of the outlet zone to be divided in a sealed manner in each position of the air flap, this region being smaller than the area of the air flap. Mutual interference between the air flows, owing to the build-up of back-pressure for example, can be effectively prevented by using one region for sealing between the two ducts, the dimensioning of this region as only part of the area of the overall flap allowing effective exposure of clear cross sections and low-noise positioning in the open positions.

This region advantageously corresponds essentially to part of the lateral surface of a cylinder, allowing the sealing function to be embodied simply as a contact seal which can be formed by a sealing lip or some other elastically deformable element, for example.

To enable a further reduction in the noise generated as air flows past the air flap, it is possible for this region to be assigned an air guide surface on the side associated with the pivot, it being possible in particular, for this surface preferably to extend essentially in the manner of a chord relative to the lateral surface of the cylinder.

Another factor to be taken into account, apart from noise generation, in the context of heating, ventilation and/or air-conditioning systems, is flow resistance, for which reason the surface of the flap is advantageously designed as an air guide surface which is adapted to the end positions as regards the flow. This enables the flow profile, which differs from case to case, e.g. that in the mixing zone, to be taken into account.

The surface of the air flap can have at least one essentially flat section or, alternatively, can be essentially flat or planar overall. The provision of flat sections makes it possible to block cross sections of air ducts in an effective manner, flush contact with walls of the air-ducting device being made possible in the open positions.

The surface of the air flap is advantageously of essentially S-shaped design in section. By virtue of such a configuration, an advantageous leading edge, on the one hand, and improved contact characteristics in the closed or end positions can be obtained in any position.

To enable even larger cross sections to be exposed, it is advantageous if the surface of the flap is spaced apart from the pivot of the flap. By means of this configuration, the air flap can in some measure be pivoted out of the respective duct in question, in some measure with the swinging movement.

It is furthermore preferred that, in the end positions, the effective area is formed essentially by the region and in each case one adjoining region. The transition between the region and the adjoining regions can form different angles depending on the configuration, and the ratio can also be varied in accordance with the structural requirements.

Finally, it is preferred that a device which influences the air flow, flow velocity and/or the pressure be provided. Such a device can comprise a ramp-shaped guide vane, a guide rib or a partition acting in the manner of a dam gate, either individually or in combination. This configuration is advantageous particularly for those positions of the air flap in which one airflow is considerably less than the other, e.g. in a position close to one of the end positions. Satisfactory mixing of the air flows overall can be achieved in such situations and, in particular, there is also the possibility of achieving particular temperature stratifications or temperature profiles.

BRIEF DESCRIPTION OF THE DRAWINGS

Further advantages and features of the present invention will emerge from the following description, given purely by way of example, of currently preferred embodiments, the description referring to the attached drawings, in which.

DESCRIPTION OF THE PREFERRED EMBODIMENTS

Figure 1:
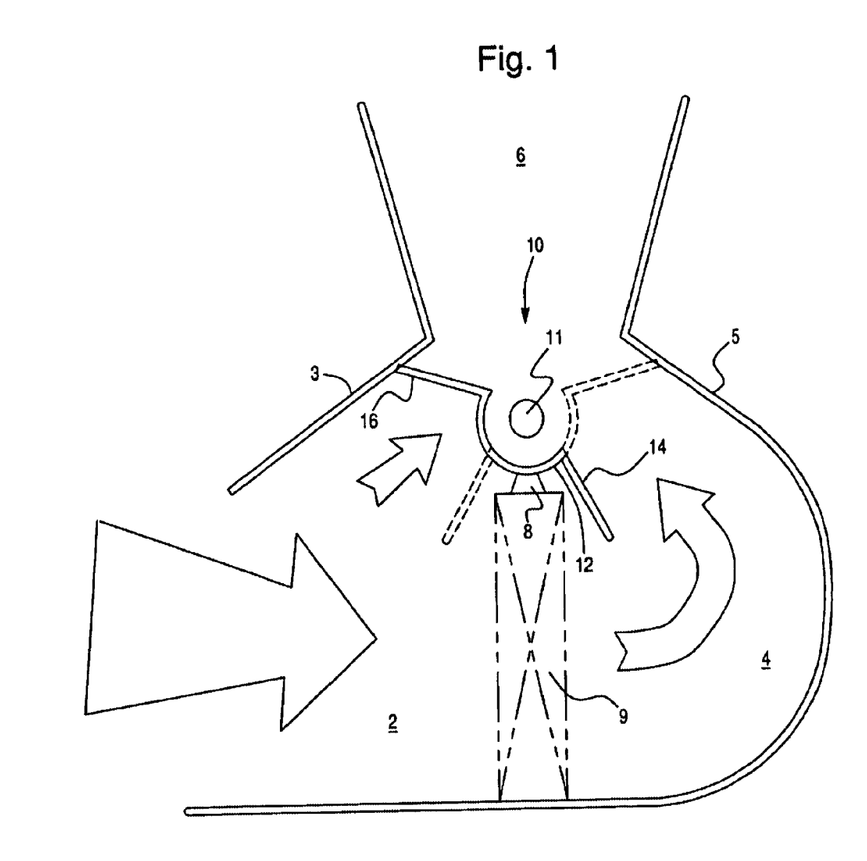
FIG. 1 shows a schematic sectional view of part of an air-ducting device with an air flap according to the invention in accordance with a first preferred embodiment.

In FIG. 1, the part of a heating/air-conditioning system is shown as the air-ducting device. This comprises wall sections 3, 5, which define an outlet duct 6, a warm-air duct 4 and a fresh-air duct 2. Between the cold-air duct and the warm-air duct there is a heating heat exchanger 9, above which is arranged a mixed-air flap 10, which can be pivoted relative to a pivot 11.

In the illustration, the mixed-air flap 10 is shown in solid lines in an intermediate position, in dashes in the fresh-air position and is dash lines in the warm-air position, corresponding arrows indicating the air flow in the respective positions. To provide a seal between ducts 2 and 4, a sealing element 8 is provided above the heating heat exchanger 9, a section 12 of the air flap 10 being in engagement with this sealing element. In the embodiment illustrated, the region 12 is designed as a semi-cylindrical shell, this region 12 being adjoined by two flat elements 14, 16, which extend essentially radially to the pivot 11.

As illustrated, the air flap 10 rests against wall section 5 in the warm-air position (illustrated in dashes) and thus prevents air which has passed through the heat exchanger 9 from entering the outlet duct 6. Since there is sealing engagement between the sealing element 8 and region 12 in every position, the entire quantity of fresh air in duct 2 is fed to the outlet duct 6 in the said position of the air flap 10.

In the other end position (illustrated in solid lines), the other flap section 16 of the air flap 10 rests against wall section 3, ensuring that air can only reach the outlet opening 6 after passing through the heating heat exchanger. As can clearly be seen from the figure, ducts 2 and 4 are divided in a sealed manner in every position of the air flap 10 insofar as the region upstream of the mixed-air flap 10 is concerned. It can furthermore be seen that large cross sections can be exposed in any position and that the air flap can be situated in a way which is advantageous in terms of flow and thus in a manner that reduces noise, at least in the end positions.

Figure 2:
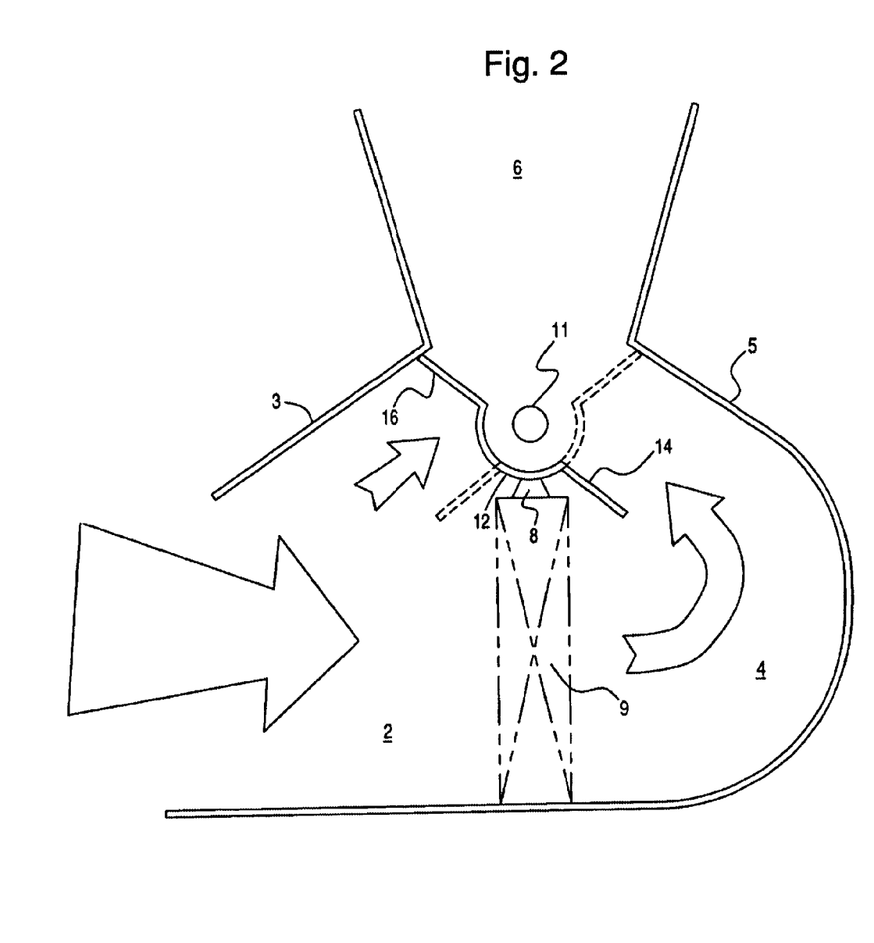
FIG. 2 shows a view similar to FIG. 1 of a second preferred embodiment.

Like FIG. 1, FIG. 2 illustrates part of a heating/air-conditioning system, an air flap according to the invention once again being provided above the heating heat exchanger 9 in such a way that there is sealing engagement between the region 12 and the sealing element. In contrast to the embodiment shown in FIG. 1, only the end positions are shown, in dashed lines and in solid lines respectively, the flat sections 14, 16 extending in a plane which does not pass through the pivot 11. As can clearly be seen, the entire surface of the air flap 10 is formed by regions 14, 16 and region 12, and, according to the invention, region 12 is thus smaller than the total area of the air flap.

It is furthermore particularly clearly evident from this illustration that the effective area in the respective end positions is formed essentially by region 12 and either section 14 or section 16, depending on the position of the air flap.

Figure 3:
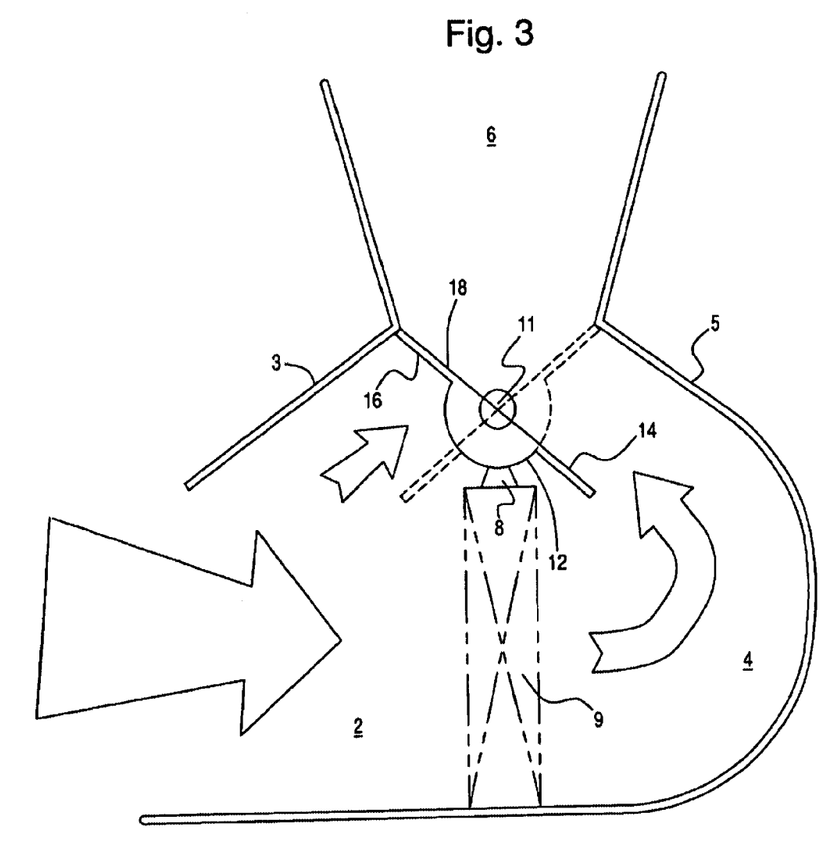
FIG. 3 shows a development of the embodiment shown in FIG. 2.

FIG. 3 shows a development of the embodiment shown in FIG. 2, this consisting in that the cavity facing the pivot 11 and formed by region 12 is closed off by an air guide element 18, the air flap 10 thus being essentially flat overall, with a region 12 which corresponds to a segment of a cylinder and ensures sealing.

Figure 4:
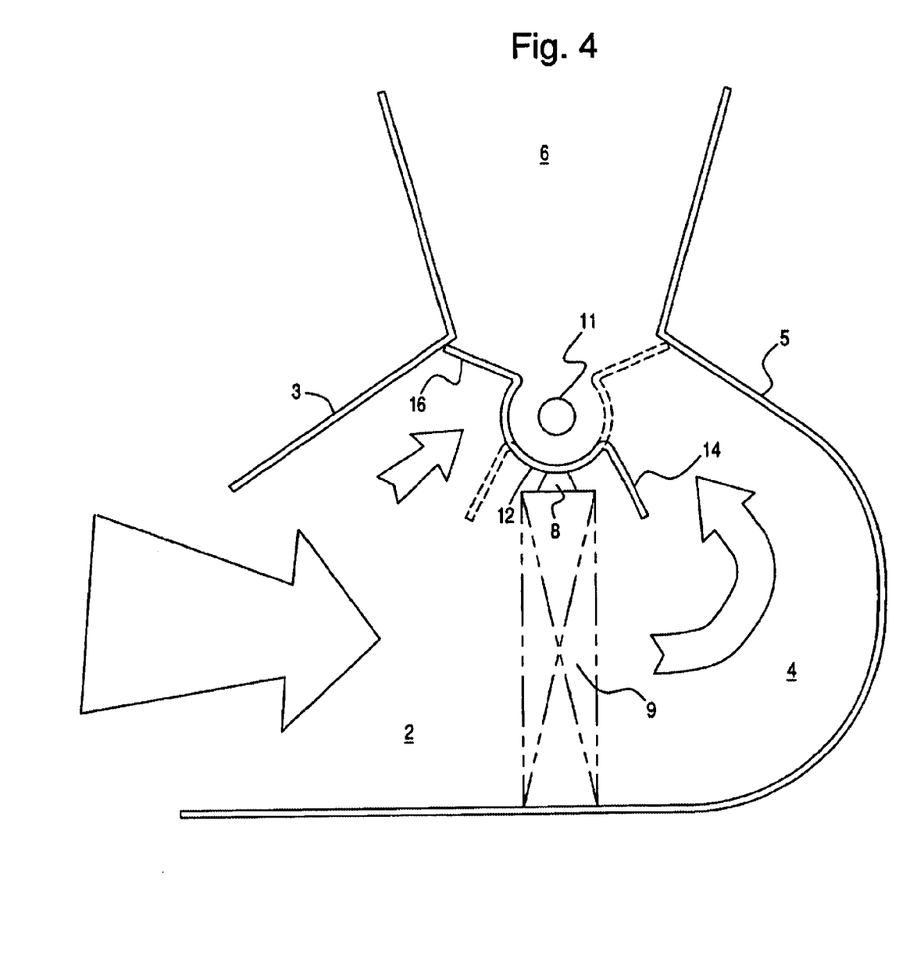
FIG. 4 shows another embodiment of an air flap according to the invention in an air-ducting device in a view similar to that in FIGS. 1–3.
Figure 5:
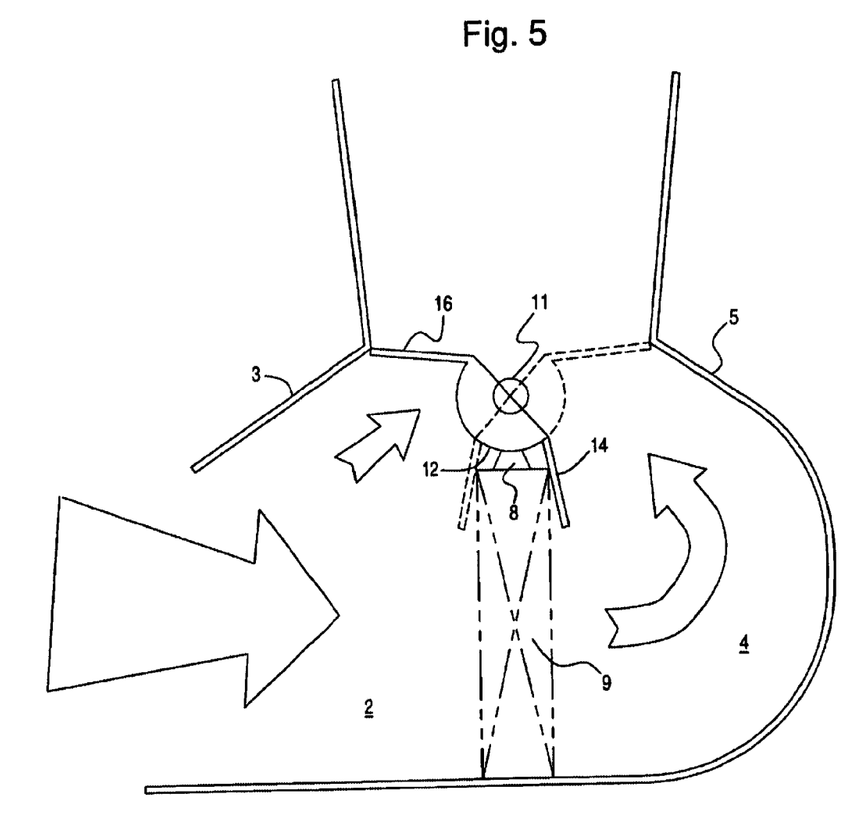
FIG. 5 shows a development of the embodiment shown in FIG. 4.

FIGS. 4 and 5 show further embodiments in accordance with the illustrations in FIGS. 3 and 4, acute angles being formed between region 12 and sections 14, 16, thereby allowing the clear cross section to be further enlarged in the end positions, as can be seen.

Figure 6:
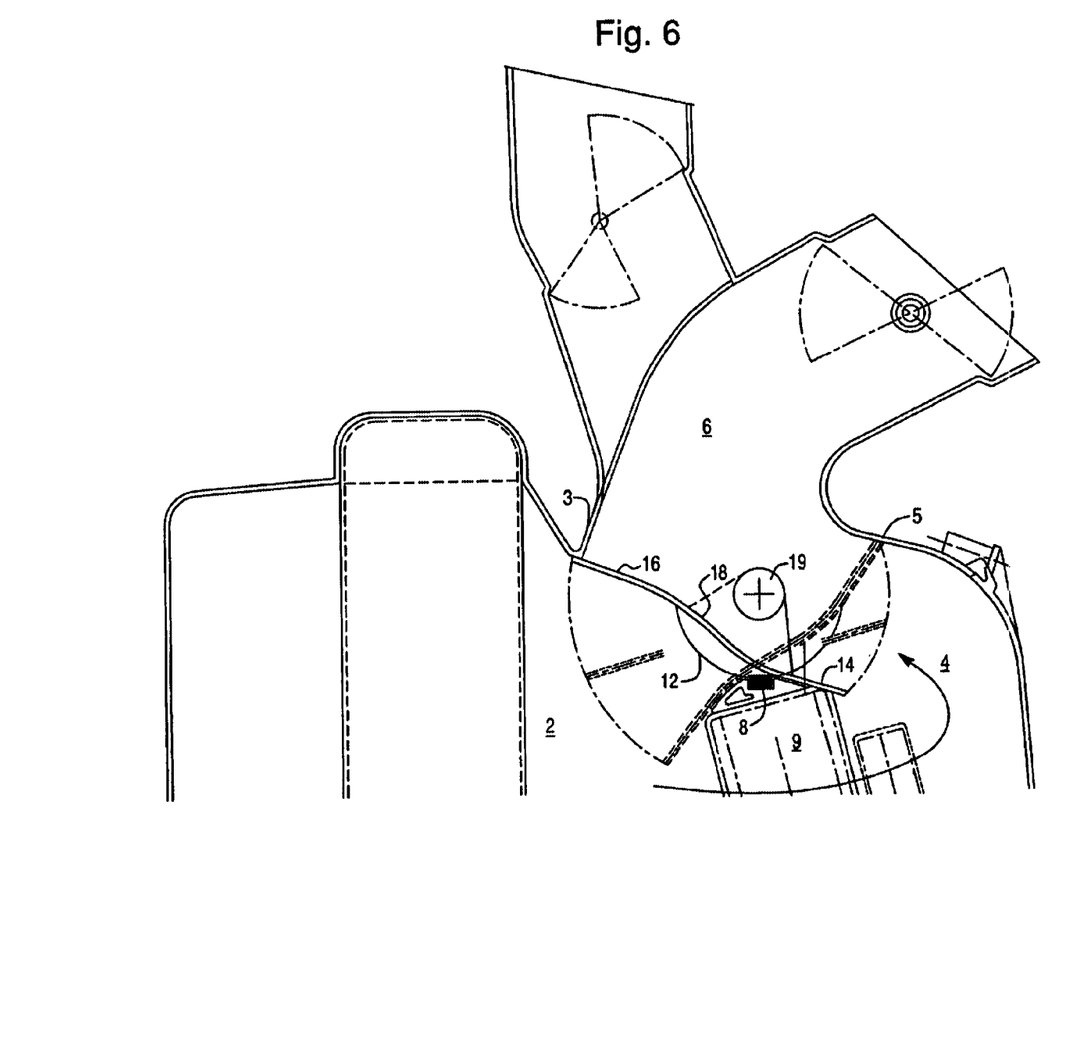
FIG. 6 shows a schematic sectional view of the part of a heating, ventilation and/or air-conditioning system with a mixed-air flap as a preferred embodiment of the air flap according to the invention.

FIG. 6 shows a schematic section of yet another heating/air-conditioning system, which, as above, has a fresh-air duct 2 and a warm-air duct 4. As in the case of the preceding embodiments, the mixed-air flap is arranged above the heating heat exchanger 9 and is in engagement with the latter via a sealing element 8 by means of region 12. In the embodiment illustrated, an S-shaped air-guiding flap surface is provided, this allowing an optimised flow profile in the respective end positions, as illustrated. It can also clearly be seen that the pivot is spaced apart from the effective area of the flap, with the result that during a rotary movement the effective area is pivoted virtually out of the respective air ducts.

Figure 7:
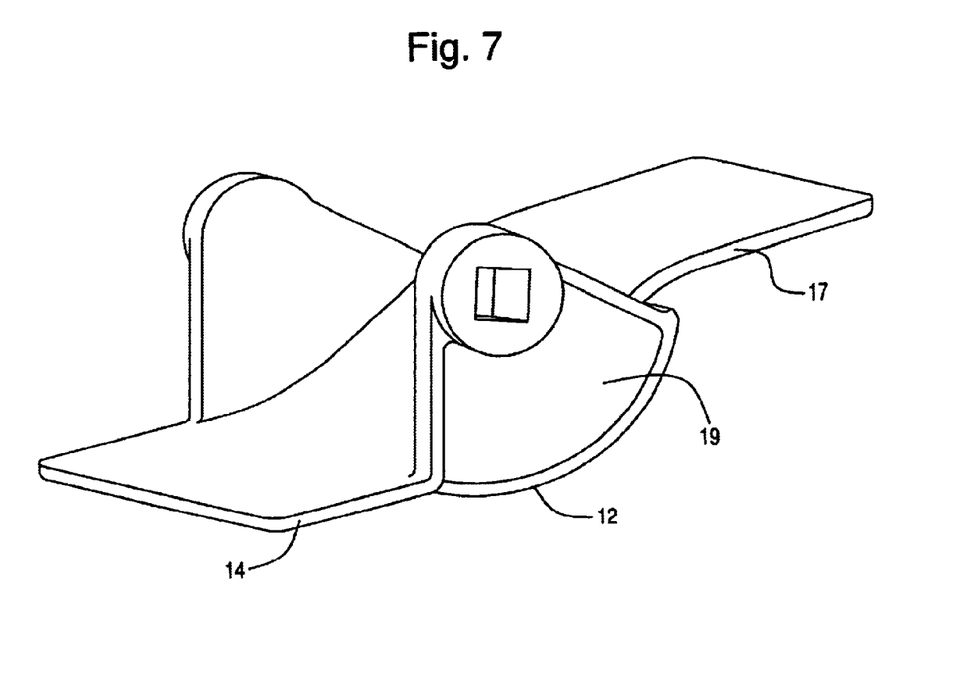
FIG. 7 shows a perspective view of the mixed-air flap shown in FIG. 6.

FIG. 7 shows the air flap shown in FIG. 6 in perspective view, the region 12 being provided with lateral cheeks 19 in order to allow lateral air guidance and sealing as well.

Figure 8:
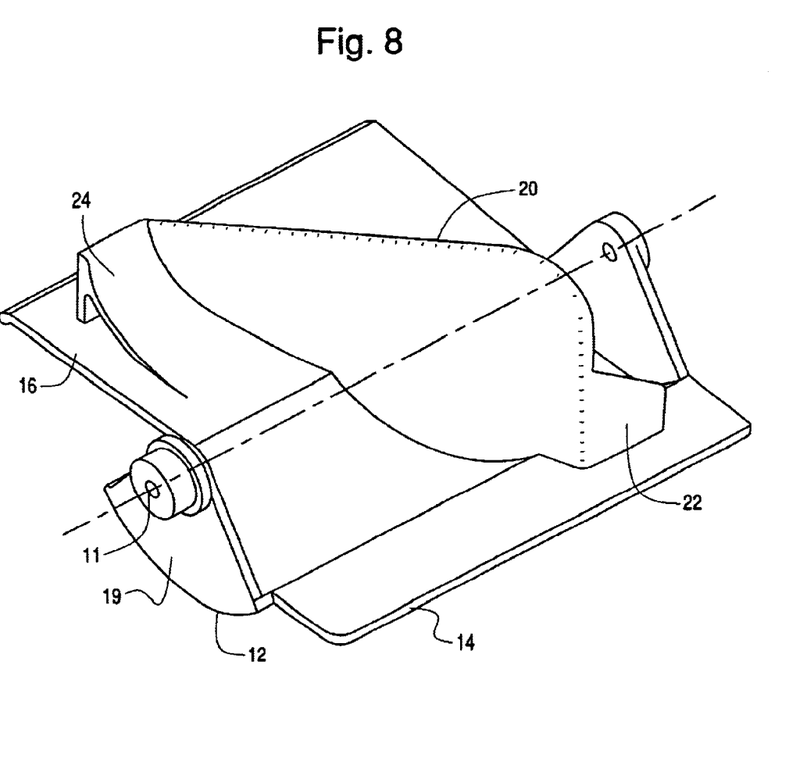
FIG. 8 shows a perspective view of a development of an air flap according to the invention.

FIG. 8 shows a perspective view of a development of an air flap according to the invention, in which a device 20, 22, 24 which influences air flow, air velocity and pressure is provided, this device comprising three sections in the example illustrated, each of which could also be employed individually, i.e. without the other two. The first section forms a guide rib 20, which extends essentially perpendicular to the air flap and is positioned obliquely relative to the direction of flow. This guide rib can be used to increase a relatively low flow velocity on the flow side or a relatively low pressure on the outflow side of the air flap. It is also possible, by means of the upper profile of this guide rib, to change the location at which the two air flows come into contact with one another, making it possible to achieve effective mixing in accordance with the geometry. A second section, which likewise serves to modify the flow velocity or direction of flow and pressure conditions, is formed by a guide vane 24 in the form of a ski jump, which in the example illustrated tapers with increasing deflection of the air to be guided in accordance with the guide rib 20. A partition 22 is furthermore illustrated, this being constructed simply in the form of a wall extending essentially perpendicular to the air flap and the direction of flow.

Figure 9:
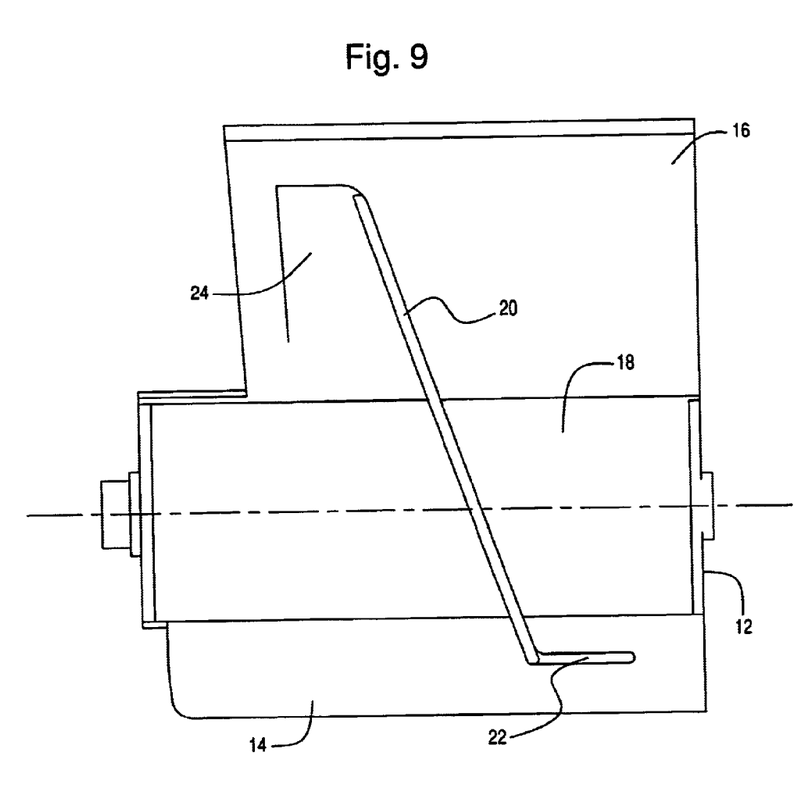
FIG. 9 shows an elevation of the air flap shown in FIG. 8.

The fact that the device is formed by three adjoining sections 20, 22, 24 is also evident from the elevation in FIG. 9, although it should be noted that the device shown is to be regarded as purely illustrative since, in particular, it could also comprise just the guide rib 20, the guide vane 24 or the partition 22, optionally supplemented by one of the two other sections or by other suitable means in order to optimize the flow profile, the flow velocity, the pressure and the resulting mixing of the two air flows, especially for states where the air flap according to the invention is offset only slightly from one of its extreme positions. Finally, it can be seen from the elevation in FIG. 9 that, in the embodiment illustrated here, the sections 14 and 16 of the air flap which adjoin the sealing region 12 are of different sizes. Here too, different configurations as regards size and geometry are possible.

In summary, it can be stated that the air flap according to the invention allows separation between two air ducts up to a point after the air flap and can expose the respective ducts in such a way that the flow resistance is extremely low. Although the present invention has been fully described above by way of example with reference to currently preferred embodiments, the person skilled in the art should recognise that a very wide variety of changes and modifications are possible within the scope of the claims. The person skilled in the art should also recognise that individual features of one embodiment can be combined in any desired way with other features of other embodiments. Finally, it should be noted that region 12 has been described above by way of example as part of a cylindrical surface, but corresponding configuration as part of a sphere would likewise be possible.

What is claimed is:

1. An air ducting system, in at least one of a vehicle heating, ventilation and air conditioning system, said system comprising:
   at least two ducts (2, 4) defining at least a first air flow path, and a heat exchanger air flow path,
   said ducts having a common outlet zone,
   a sealing element (8) rotatably connected to the center portion of an air flap (10),
   said sealing (8) element connected to and forming a seal with a heat exchanger 9,
   said heat exchanger (9) connected to and forming a seal with one of said two ducts (4).

2. The system of claim 1, wherein said air flap (10) has a first position in which only said first air flow path is open,
   said air flap having a heat exchanger position in which only said heat exchanger air flow path is open, and
   said air flap having an intermediate position, in which air from said first air flow path and said heat exchanger air flow path mixes in said common outlet zone.

3. The system of claim 2, wherein said air flap (10) comprises a planar first section, an arcuate middle section, and a planar second section.

4. The system of claim 3, wherein said arcuate middle section partially encompasses an air flap pivot point (11).

5. The system of claim 4, wherein said middle section is rotatably connected to said sealing element (8).

6. The system of claim 5, wherein said first section and said second section are in linear alignment, having a centerline that passes through said pivot point (11).

7. The system of claim 5, wherein said first portion and said second sections are in linear alignment, having a center line that does not pass through said pivot point (11).

8. The system of claim 5, wherein said first section and said second section are not in linear alignment.

9. The system of claim 5, wherein said first and said second section each form an acute angle between said first and second sections, and said middle section.

10. The system of claim 5, wherein each of said first, second, and middle sections are the same length.

11. The system of claim 5, wherein each of said first, second, and middle sections are different lengths.

12. The system of claim 5, wherein said first and said second sections are about the same length, and said middle section is a different length.

13. The system of claim 5, wherein said sealing element (8) has a truncated cone crossectional shape.

14. The system of claim 2, wherein, said air flap (10) is comprised of three connected non-aligned planar segments.

15. The system of claim 14, wherein each of said three connected non-aligned planar segments are of about equal lengths.

16. The system of claim 14, wherein each of said three connected non-aligned planar segments are different lengths.

17. The system of claim 14, wherein said three connected non-aligned planar segments form an S-shaped air flap (10).

18. The system of claim 5, wherein said air flap (10) further comprises a guide rib (20),
   said guide rib (20) extending perpendicular to said air flap (10), and positioned obliquely relative to the direction of air flow.

19. The system of claim 18, wherein said air flap (10) further comprises an arcuate guide vane (24),
   said arcuate guide vane (24) being positioned adjacent to said guide rib (20).

20. The system of claim 19, wherein said air flap (10) further comprises a partition (22),
   said partition (22) comprising a wall extending perpendicular from said air flap (10), and
   said partition (22) extending perpendicular to the direction of air flow,
   said partition (22) being positioned adjacent to said guide rib (20).

21. The system of claim 2, further comprising one of, a guide rib (20), a guide vane (24) or a partition (22).

22. An air flap, for a vehicle climate control system, said system comprising:
   at least two ducts (2, 4) defining at least a first air flow path, and a heat exchanger air flow path,
   said ducts converging into a common outlet zone,
   a sealing element (8) rotatably connected to the center portion of an air flap (10),
   said air flap (10) having a first position in which only said first air flow path is open,
   said air flap having a heat exchanger position in which only said heat exchanger air flow path is open, and
   said air flap having an intermediate position, in which air from said first air flow path and said heat exchanger air flow path mixes in said common outlet zone.

23. The system of claim 22, wherein said air flap (10) comprises a planar first section, an arcuate middle section, and a planar second section.

24. The system of claim 22, wherein said arcuate middle section partially encompasses an air flap pivot point (11).

25. The system of claim 24, wherein said middle section is rotatably connected to said sealing element (8).

26. The system of claim 25, wherein said first section and said second section are in linear alignment, having a centerline that passes through said pivot point (11).

27. The system of claim 25, wherein said first section and said second sections are in linear alignment, having a center line that does not pass through said pivot point (11).

28. The system of claim 25, wherein said first section and said second section are not in linear alignment.

29. The system of claim 25, wherein said first and said second section each form an acute angle between said first and second sections, and said middle section.

30. The system of claim 25, wherein each of said first, second, and middle sections are the same length.

31. The system of claim 25, wherein each of said first, second, and middle sections are different lengths.

32. The system of claim 25, wherein said first and said second sections are about the same length, and said middle section is a different length.

33. The system of claim 25, wherein said sealing element (8) has a truncated cone crossectional shape.

34. The system of claim 22, wherein, said air flap (10) is comprised of three connected non-aligned planar segments.

35. The system of claim 34, wherein each of said three connected non-aligned planar segments are of about equal lengths.

36. The system of claim 34, wherein each of said three connected non-aligned planar segments are different lengths.

37. The system of claim 34, wherein said three connected non-aligned planar segments form an S-shaped air flap (10).

38. The system of claim 22, wherein said air flap (10) further comprises a guide rib (20), said guide rib (20) extending perpendicular to said air flap (10), and positioned obliquely relative to the direction of air flow.

39. The system of claim 38, wherein said air flap (10) further comprises an arcuate guide vane (24), said arcuate guide vane (24) being positioned adjacent to said guide rib (20).

40. The system of claim 39, wherein said air flap (10) further comprises a partition (22), said partition (22) comprising a wall extending perpendicular from said air flap (10), and said partition (22) extending perpendicular to the direction of air flow, said partition (22) being positioned adjacent to said guide rib (20).

41. The system of claim 22, further comprising one of, a guide rib (20), a guide vane (24) or a partition (22).

* * * * *